US011709543B2

(12) United States Patent
Wu

(10) Patent No.: US 11,709,543 B2
(45) Date of Patent: Jul. 25, 2023

(54) SWITCHING METHOD AND SYSTEM OF INTERACTIVE MODES OF HEAD-MOUNTED DEVICE

(71) Applicant: QINGDAO PICO TECHNOLOGY CO., LTD., Shandong (CN)

(72) Inventor: Tao Wu, Shandong (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/816,411

(22) Filed: Jul. 30, 2022

(65) Prior Publication Data

US 2022/0365589 A1 Nov. 17, 2022

Related U.S. Application Data

(63) Continuation of application No. PCT/CN2021/116300, filed on Sep. 2, 2021.

(30) Foreign Application Priority Data

Feb. 18, 2021 (CN) .......................... 202110190095.8

(51) Int. Cl.
*G06F 3/01* (2006.01)
*G06V 40/20* (2022.01)
(Continued)

(52) U.S. Cl.
CPC .............. *G06F 3/011* (2013.01); *G06F 3/017* (2013.01); *G06F 3/0346* (2013.01); *G06V 40/28* (2022.01); *H04N 23/90* (2023.01)

(58) Field of Classification Search
CPC ........ G06F 3/011; G06F 3/017; G06F 3/0346; G06F 3/012; G06F 3/0383; G06F 3/0338;
(Continued)

(56) References Cited

U.S. PATENT DOCUMENTS

2009/0197635 A1  8/2009 Kim
2017/0357332 A1* 12/2017 Balan ...................... G06F 3/017
(Continued)

FOREIGN PATENT DOCUMENTS

CN   101604203 A   12/2009
CN   102270038 A   12/2011
(Continued)

OTHER PUBLICATIONS

Search Report dated Nov. 2, 2021 for PCT Application No. PCT/CN2021/116300.

*Primary Examiner* — Grant Sitta

(57) ABSTRACT

A switching method and system of interactive modes of a head-mounted device is provided. The interactive modes include gamepad tracking interactive mode and bare hand tracking interactive mode. A standard deviation of position data, a standard deviation of attitude data and a standard deviation of accelerometer data among IMU data are acquired, respectively. Whether the standard deviation of the position data, the standard deviation of the attitude data and the standard deviation of the accelerometer data meet a first preset condition is determined. Moreover, the standard deviation of the accelerometer data within a second preset duration is acquired in real time, and whether the standard deviation of the accelerometer data meets a second preset condition is determined. In cases where the standard deviation of the accelerometer data meets the second preset condition, the bare hand tracking interactive mode is paused, and the gamepad tracking interactive mode is started.

14 Claims, 3 Drawing Sheets

(51) Int. Cl.
*G06F 3/0346* (2013.01)
*H04N 23/90* (2023.01)

(58) Field of Classification Search
CPC ........ G06V 40/28; H04N 5/247; H04N 23/90; A63F 13/00
See application file for complete search history.

(56) References Cited

U.S. PATENT DOCUMENTS

2020/0118420 A1* 4/2020 Griffin .................... G06F 3/038
2021/0109606 A1* 4/2021 Erivantcev ............. G06F 3/038

FOREIGN PATENT DOCUMENTS

| CN | 105117016 A | 12/2015 |
| CN | 111857337 A | 10/2020 |
| CN | 112947754 A | 6/2021 |

* cited by examiner

SWITCHING METHOD AND SYSTEM OF INTERACTIVE MODES OF HEAD-MOUNTED DEVICE

CROSS REFERENCE

This application is a continuation of PCT International Application No. PCT/CN2021/116300filed on Sep. 2, 2021, which claims priority to Chinese Application No. 202110190095.8 filed on Feb. 18, 2021, the entirety of which is herein incorporated by reference.

TECHNICAL FIELD

The present disclosure relates to the technical field of head-mounted integrated devices, in particular to a switching method and system of interactive modes of a head-mounted device.

BACKGROUND

At present, mainstream Virtual Reality (VR)/Augmented Reality (AR)/Mixed Reality (MR) head-mounted integrated devices can simultaneously support interaction of a gamepad tracking controller and gesture recognition. However, switching over usage of two current interactive modes needs to be manually set. Generally, switching options of the two interactive modes, i.e., an interactive mode based on gamepad tracking controller and an interactive mode based on gesture recognition are set in a User Interface (UI), through which settings are manually switched by a user.

As a large amount of computed processing resources is required to be occupied, on the VR/AR/MR integrated device, by interaction based on the gamepad tracking controller and interaction based on the gesture recognition, processing of the gamepad tracking controller and computing processing of the interaction based on gesture recognition are exclusive or processing, namely, a gesture recognition interaction processing module needs to be paused by a system in cases where the current system performs gamepad tracking interaction, or a gamepad tracking interaction processing module needs to be paused by the system in cases where the current system performs gesture recognition interaction.

In a traditional processing mechanism, a system receives, through an application layer, a control command instructing which module to process currently. However, in the field of VR/AR/MR, based on usage data of multiple users, it can be concluded that the usage frequency of the gamepad tracking controller is usually higher than that of gesture recognition. The usage frequency of gesture recognition is seriously affected by tedious manual switching over usage of the two interactive modes, and user experience is reduced.

SUMMARY

In view of the above problem, embodiments of the present disclosure provide a switching method and system of interactive modes of a head-mounted device, which can solve the problems that existing head-mounted devices are complicated to operate and poor in flexibility in the mode interaction process, affecting user experience.

In the switching method of interactive modes of a head-mounted device provided in the embodiments of the present disclosure, the interactive modes of the head-mounted device include a gamepad tracking interactive mode and a bare hand tracking interactive mode which are able to be switched over each other. The switching method includes that: Six Degrees of Freedom (6Dof) tracking data and Inertial Measurement Unit (IMU for short) data of a gamepad are acquired, the 6Dof tracking data including position data and attitude data of the gamepad; a standard deviation of the position data, a standard deviation of the attitude data and a standard deviation of accelerometer data in the IMU data are acquired respectively; whether the standard deviation of the position data, the standard deviation of the attitude data and the standard deviation of the accelerometer data within a current first preset duration meet a first preset condition is determined; in cases where the standard deviation of the position data, the standard deviation of the attitude data and the standard deviation of the accelerometer data meet the first preset condition, it is determined that the gamepad tracking interactive mode is not started, and the bare hand tracking interactive mode is started; moreover, the standard deviation of the accelerometer data within a second preset duration is acquired in real time, and whether the standard deviation of the accelerometer data meets a second preset condition is determined; and in cases where the standard deviation of the accelerometer data meets the second preset condition, the bare hand tracking interactive mode is paused, and the gamepad tracking interactive mode is started.

In at least one exemplary embodiment, the process that whether the standard deviation of the position data, the standard deviation of the attitude data and the standard deviation of the accelerometer data meet the first preset condition is determined includes that: whether both the standard deviation of the position data and the standard deviation of the attitude data are less than or equal to a first preset threshold is determined, and whether the standard deviation of the accelerometer data is less than or equal to a second preset threshold is further determined in cases where both the standard deviation of the position data and the standard deviation of the attitude data are less than or equal to the first preset threshold; in cases where both the standard deviation of the position data and the standard deviation of the attitude data are less than or equal to the first preset threshold and the standard deviation of the accelerometer data is less than or equal to the second preset threshold, it is determined that the first preset condition is met.

In at least one exemplary embodiment, the first preset duration is in a range of is 1 s-4 s, and the second preset duration is in a range of is 1 s-4 s; a first preset threshold is 0.6, and the second preset threshold is 0.2.

In at least one exemplary embodiment, the first preset duration is 1.5 s.

In at least one exemplary embodiment, the process that whether the standard deviation of the accelerometer data meets the second preset condition is determined includes that: whether standard deviations of a preset number of consecutive frames of the accelerometer data within the second preset duration are more than a third preset threshold is determined; in cases where the standard deviations of the preset number of consecutive frames of the accelerometer data within the second preset duration are more than the third preset threshold, it is determined that the second condition is met.

In at least one exemplary embodiment, the second preset duration is in a range of is 1 s-4 s, and the third preset threshold is 0.03.

In at least one exemplary embodiment, the second preset duration is 1.5 s.

In at least one exemplary embodiment, the gamepad tracking interactive mode includes: connecting the gamepad with the head-mounted device through signals to perform virtual reality interaction through the gamepad. The bare hand tracking interactive mode includes: acquiring and identifying gesture information and tracking information of a bare hand to perform virtual reality interaction through the gesture information and the tracking information.

In at least one exemplary embodiment, at least one bare hand tracking camera and at least two environment tracking cameras are arranged on the head-mounted device. The at least one bare hand tracking camera are used for capturing the gesture information and the tracking information of the bare hand, and the at least two environment tracking cameras are used for acquiring 6DoF positioning information of the head-mounted device relative to a physical environment where the head-mounted device is located. The at least one bare hand tracking camera and/or the at least two environment tracking cameras include depth cameras, binocular infrared cameras, RGB cameras, or monochrome cameras.

In at least one exemplary embodiment, at least two gamepad tracking controllers are arranged in the gamepad and configured to acquire 6DoF tracking information of the gamepad relative to the head-mounted device in real time and include ultrasonic sensors, electromagnetic sensors, optical sensors and 9-axis inertial navigation sensors.

In at least one exemplary embodiment, the switching method may further include a default mode setting process. The default mode setting process includes: setting a default mode as the gamepad tracking interactive mode or the bare hand tracking interactive mode through a control system connected with the head-mounted device. The control system is further used for controlling switching over the gamepad tracking interactive mode and the bare hand tracking interactive mode.

In at least one exemplary embodiment, in cases where the standard deviation of the position data, the standard deviation of the attitude data and the standard deviation of the accelerometer data meet the first preset condition, the control system starts the bare hand tracking interactive mode and correspondingly stops the gamepad tracking interactive mode. In cases where the standard deviation of the accelerometer data meets the second preset condition, the control system starts the gamepad tracking interactive mode and correspondingly stops the bare hand tracking interactive mode.

In at least one exemplary embodiment, the switching method may further include that: in cases where the standard deviation of the accelerometer data does not meet the second preset condition, the bare hand tracking interactive mode is continued to be executed, and the gamepad tracking interactive mode is paused.

The switching system of interactive modes of the head-mounted device, provided in the embodiments of the present disclosure, may include a tracking data and IMU data acquisition unit, a standard deviation acquisition unit, a first preset condition determining unit and a second preset condition determining unit. The tracking data and IMU data acquisition unit is configured to acquire the 6Dof tracking data and the IMU data of the gamepad, and the 6Dof tracking data include the position data and the attitude data of the gamepad. The standard deviation acquisition unit is configured to respectively acquire the standard deviation of the position data, the standard deviation of the attitude data and the standard deviation of the accelerometer data in the IMU data. The first preset condition determining unit is configured to determine whether the standard deviation of the position data, the standard deviation of the attitude data and the standard deviation of the accelerometer data within the current first preset duration meet the first preset condition, and in cases where the standard deviation of the position data, the standard deviation of the attitude data and the standard deviation of the accelerometer data meet the first preset condition, to determine that the gamepad tracking interactive mode is not started and to start the bare hand tracking interactive mode. The second preset condition determining unit is configured to acquire the standard deviation of the accelerometer data within the second preset duration in real time, determine whether the standard deviation of the accelerometer data meets the second preset condition, and pause the bare hand tracking interactive mode and start the gamepad tracking interactive mode in cases where the standard deviation of the accelerometer data meets the second preset condition.

In at least one exemplary embodiment, the first preset condition determining unit is configured to determine whether the standard deviation of the position data, the standard deviation of the attitude data and the standard deviation of the accelerometer data meet the first preset condition in a following manner: determining whether both the standard deviation of the position data and the standard deviation of the attitude data are less than or equal to a first preset threshold, and continuing to determine whether the standard deviation of the accelerometer data is less than or equal to a second preset threshold in cases where the standard deviation of the position data and the standard deviation of the attitude data are less than or equal to the first preset threshold; and determining that the first preset condition is met in cases where both the standard deviation of the position data and the standard deviation of the attitude data are less than or equal to the first preset threshold and the standard deviation of the accelerometer data is less than or equal to the second preset threshold.

In at least one exemplary embodiment, the second preset condition determining unit is configured to determine whether the standard deviation of the accelerometer data meets the second preset condition in a following manner: determining whether the standard deviations of a preset number of consecutive frames of the accelerometer data within the second preset duration are more than a third preset threshold; and determining that the second preset condition is met in cases where the standard deviations of the preset number of consecutive frames of the accelerometer data within the second preset duration are more than the third preset threshold.

In at least one exemplary embodiment, the gamepad tracking interactive mode includes: connecting the gamepad with the head-mounted device through signals to perform virtual reality interaction through the gamepad. The bare hand tracking interactive mode includes: acquiring and identifying the gesture information and the tracking information of the bare hand to perform virtual reality interaction through the gesture information and the tracking information.

In at least one exemplary embodiment, at least one bare hand tracking camera and at least two environment tracking cameras are arranged on the head-mounted device. The at least one bare hand tracking camera are used for capturing the gesture information and the tracking information of the bare hand, and the at least two environment tracking cameras are used for acquiring 6DoF positioning information of the head-mounted device relative to a physical environment where the head-mounted device is located. The at least one bare hand tracking camera and/or the at least two environment tracking cameras include depth cameras, binocular infrared cameras, RGB cameras, or monochrome cameras.

In at least one exemplary embodiment, at least two gamepad tracking controllers are arranged in the gamepad and configured to acquire 6DoF tracking information of the gamepad relative to the head-mounted device in real time. The gamepad tracking controllers include ultrasonic sensors, electromagnetic sensors, optical sensors and 9-axis inertial navigation sensors.

The embodiments of the present disclosure provide a non-transitory computer-readable storage medium, having a computer program stored thereon. The computer program, when executed by a processor, implements the method according to any one of embodiments or exemplary embodiments.

By means of the switching method and system of interactive modes of a head-mounted device, starting or stopping of the gamepad tracking interactive mode and the bare hand tracking interactive mode is determined by determining whether the standard deviation of the position data, the standard deviation of the attitude data and the standard deviation of the accelerometer data within a current first preset duration meet a first preset condition. Moreover, starting or stopping of the bare hand tracking interactive mode and the gamepad tracking interactive mode is determined by determining whether the standard deviation of the accelerometer data meets the second preset condition in real time. The interactive modes can be stably, naturally and smoothly switched according to current actions or behavioral habits of a user, thereby providing a good user experience and having a wide applicable range.

In order to achieve the above and related objectives, one or more aspects of the present disclosure include characteristics that will be explained in detail later. The following description and drawings describe some exemplary aspects of the embodiments of the present disclosure in detail. However, the aspects only indicate some of various ways allowing usage of principles of the present disclosure. Besides, the present disclosure is intended to include all the aspects and equivalents thereof.

BRIEF DESCRIPTION OF THE DRAWINGS

With reference to the following description of drawings, with more comprehensive understanding of the embodiments of the present disclosure, other objectives and results of the embodiments of the present disclosure will be clearer and easily understood. In the drawings.

The same reference signs indicate similar or corresponding characteristics or functions in all the figures.

DETAILED DESCRIPTION OF THE EMBODIMENTS

In the following description, in order to explain and enable comprehensive understanding of one or more embodiments, many specific details are explained. However, apparently, the embodiments may be implemented without these specific details. In the other examples, in order to conveniently describe one or more embodiments, well known structures and devices are shown in the form of a block diagram.

In order to describe a switching method and system of interactive modes of a head-mounted device in detail, exemplary embodiments of the present disclosure are described in combination with the drawings in detail.

Figure 1:
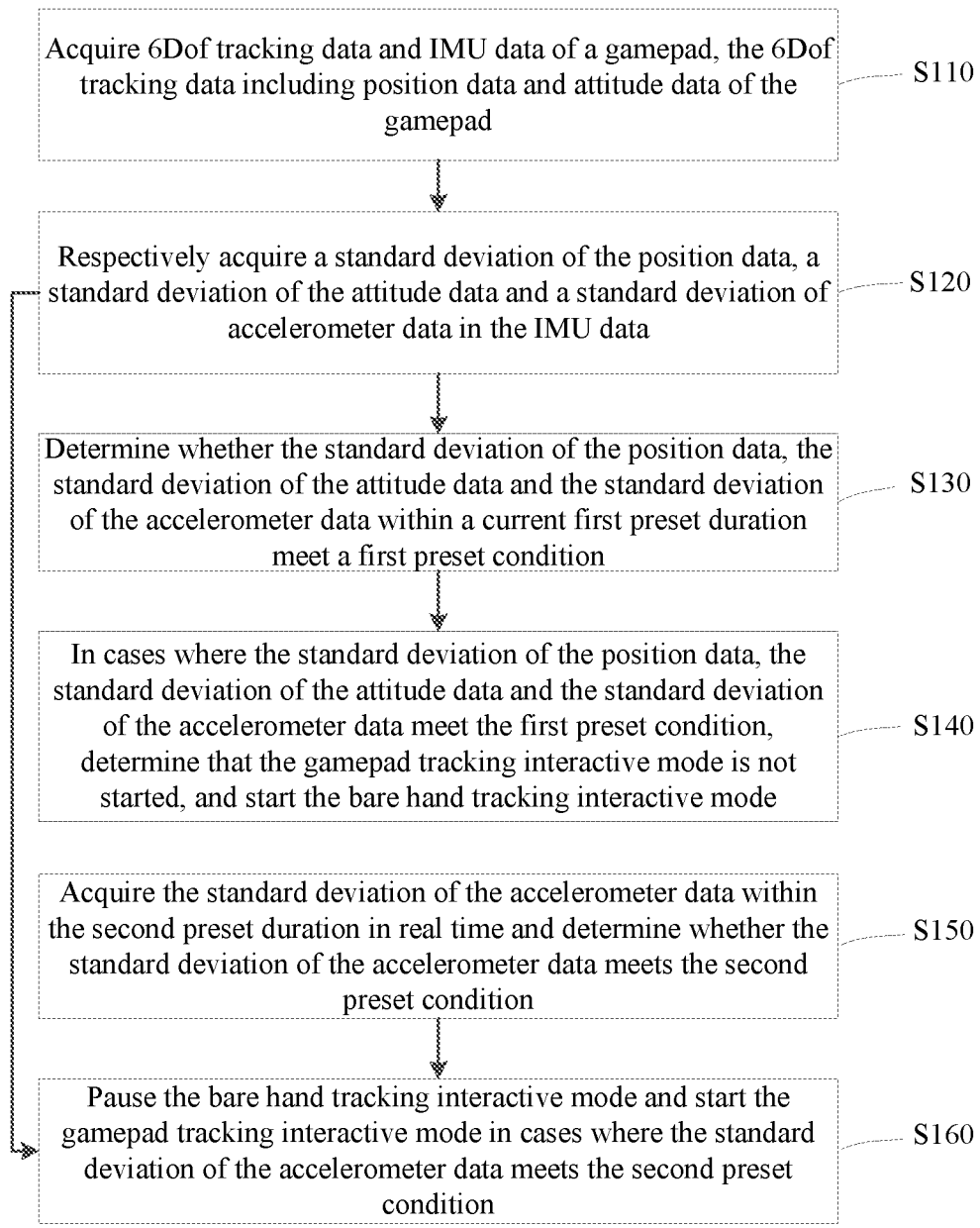
FIG. 1 is a flowchart of a switching method of interactive modes of a head-mounted device according to some embodiments of the present disclosure.

FIG. 1 shows a flow of a switching method of interactive modes of a head-mounted device according to some embodiments of the present disclosure.

As shown in FIG. 1, in the switching method of interactive modes of a head-mounted device according to the embodiment of the present disclosure, the interactive modes of the head-mounted device include a gamepad tracking interactive mode and a bare hand tracking interactive mode which are able to be switched over each other. The switching method includes the following operations S110 to S160.

In S110, 6Dof tracking data and IMU data of a gamepad are acquired, the 6Dof tracking data including position data and attitude data of the gamepad.

In S120, a standard deviation of the position data, a standard deviation of the attitude data and a standard deviation of accelerometer data in the IMU data are acquired, respectively.

In S130, whether the standard deviation of the position data, the standard deviation of the attitude data and the standard deviation of the accelerometer data within a current first preset duration meet a first preset condition is determined.

In S140, in cases where the standard deviation of the position data, the standard deviation of the attitude data and the standard deviation of the accelerometer data meet the first preset condition, it is determined that the gamepad tracking interactive mode is not started, and the bare hand tracking interactive mode is started.

In some exemplary implementations, the process that whether the standard deviation of the position data, the standard deviation of the attitude data and the standard deviation of the accelerometer data within first preset duration meet the first preset condition is determined includes the following operations.

Firstly, whether both the standard deviation of the position data and the standard deviation of the attitude data are less than or equal to a first preset threshold is determined, and whether the standard deviation of the accelerometer data is less than or equal to a second preset threshold is further determined in cases where both the standard deviation of the position data and the standard deviation of the attitude data are less than or equal to the first preset threshold. In cases where both the standard deviation of the position data and the standard deviation of the attitude data are less than or equal to the first preset threshold and the standard deviation of the accelerometer data is less than or equal to the second preset threshold, it is determined that the first preset condition is met.

The first preset duration may be set to be in a range of is 1 s-4 s, preferably, 1.5 s, and the second preset duration is in a range of is 1 s-4 s. The first preset threshold is 0.6, and the second preset threshold is 0.2.

It is to be noted that in cases where the standard deviation of the position data, the standard deviation of the attitude data and the standard deviation of the accelerometer data do not meet the first preset condition, which indicates that the current gamepad tracking interactive mode has been started by default, and the bare hand tracking interactive mode need not to be started at the moment.

In S150, in the above process of determining the first preset condition, the standard deviation of the accelerometer data within the second preset duration is acquired in real time and whether the standard deviation of the accelerometer data meets the second preset condition is determined.

In S160, the bare hand tracking interactive mode is paused and the gamepad tracking interactive mode is started in cases where the standard deviation of the accelerometer data meets the second preset condition. Otherwise, the bare hand tracking interactive mode is continued to be executed, and the gamepad tracking interactive mode is paused.

In some exemplary implementations, the process that whether the standard deviation of the accelerometer data meets the second preset condition is determined includes: whether standard deviations of a preset number of consecutive frames of the accelerometer data within the second preset duration are more than a third preset threshold is determined; in cases where the standard deviations of the preset number of consecutive frames of the accelerometer data within the second preset duration are more than the third preset threshold, it is determined that the second conditions are met.

The second preset duration may be set to be in a range of is 1 s-4 s, preferably, 1.5 s. The third preset threshold may be set to be 0.03. A preset number of consecutive frames can be selected from consecutive 3-10 or 5-10 frames and the like, preferably, 5 frames. In other words, in cases where the standard deviations of the accelerometer data within 1.5 s of consecutive 5 frames are greater than 0.03, it can be determined that a user begins to use the gamepad tracking interactive mode again, the bare hand tracking interactive mode can be paused, and the gamepad tracking interactive mode is started.

It is to be noted that relevant data of the first preset duration, the second preset duration, the first preset threshold, the second preset threshold, the third preset threshold and a preset number of consecutive frames may be set and adjusted according to specific application products and application environments or customer requirements, and not limited to above specific values.

In an exemplary implementation of the present disclosure, the gamepad tracking interactive mode includes: connecting the gamepad with the head-mounted device through signals to perform virtual reality interaction by operating the gamepad. The bare hand tracking interactive mode includes: acquiring and identifying gesture information and tracking information of a bare hand through cameras arranged on the head-mounted device to perform virtual reality interaction through the gesture information and the tracking information.

In some exemplary implementations, at least one bare hand tracking camera and at least two environment tracking cameras are arranged on the head-mounted device. The at least one bare hand tracking camera are used for capturing the gesture information and the tracking information of the bare hand, and the at least two environment tracking cameras are used for acquiring 6DoF positioning information of the head-mounted device relative to a physical environment where the head-mounted device is located. The above bare hand tracking cameras and/or environment tracking cameras include depth cameras, binocular infrared cameras, RGB cameras, or monochrome cameras and the like. The cameras may be flexibly selected in specific applications.

Besides, at least two gamepad tracking controllers are arranged in the gamepad and configured to acquire 6DoF tracking information of the gamepad relative to the head-mounted device in real time. The gamepad tracking controllers include ultrasonic sensors, electromagnetic sensors, optical sensors, 9-axis inertial navigation sensors and the like.

It is to be noted that after the head-mounted device is started, the head-mounted device will enter a default interactive mode, and the default interactive mode may be set through a control system connected with the head-mounted device. It can be known that the switching method of interactive modes of a head-mounted device further includes a default mode setting process, which includes: setting a default mode as the gamepad tracking interactive mode or the bare hand tracking interactive mode through the control system connected with the head-mounted device. The control system is further used for controlling switching over the gamepad tracking interactive mode and the bare hand tracking interactive mode. In cases where standard deviations of the above parameters meet the first preset condition, the control system is used for starting the bare hand tracking interactive mode and correspondingly closing the gamepad tracking interactive mode. In cases where the standard deviation of the parameters meets the second preset condition, the control system is used for starting the gamepad tracking interactive mode and correspondingly closing the bare hand tracking interactive mode.

The embodiments of the present disclosure provide an automatic switching mode according to usage characteristics of a user for the gamepad tracking controllers and gesture recognition. When the user wants to perform virtual reality interaction through the gamepad tracking controllers (the gamepad tracking interactive mode), the system can automatically trigger tracking modules of the gamepad tracking controllers in real time. When the user wants to perform virtual reality interaction through gesture recognition, the system can automatically trigger a gesture recognition tracking module (the bare hand tracking interactive mode) in real time. In the whole process, the user does not need to manually intervene in any operations, and the two modes can be stably, naturally and smoothly switched in real time.

The embodiments of the present disclosure provide a switching system of interactive modes of a head-mounted device corresponding to the switching method of interactive modes of a head-mounted device.

Figure 2:
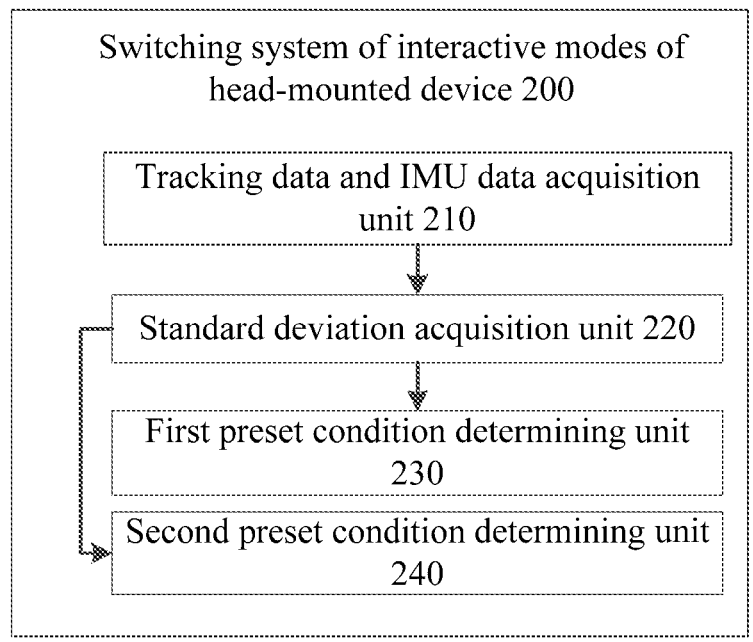
FIG. 2 is a schematic block diagram of a switching system of interactive modes of a head-mounted device according to some embodiments of the present disclosure.

FIG. 2 shows a schematic logic of a switching system of interactive modes of a head-mounted device according to some embodiments of the present disclosure.

As shown in the FIG. 2, a switching system 200 of interactive modes of a head-mounted device in the embodiment of the present disclosure includes a tracking data and IMU data acquisition unit 210, a standard deviation acquisition unit 220, a first preset condition determining unit 230 and a second preset condition determining unit 240.

The tracking data and IMU data acquisition unit 210 is configured to acquire 6Dof tracking data and IMU data of a gamepad, the 6Dof tracking data including position data and attitude data of the gamepad.

The standard deviation acquisition unit 220 is configured to respectively acquire a standard deviation of the position data, a standard deviation of the attitude data and a standard deviation of the accelerometer data in the IMU data.

The first preset condition determining unit 230 is configured to determine whether the standard deviation of the position data, the standard deviation of the attitude data and the standard deviation of the accelerometer data within a current first preset duration meet a first preset condition, and in cases where the standard deviation of the position data, the standard deviation of the attitude data and the standard deviation of the accelerometer data meet the first preset condition, determine that the gamepad tracking interactive mode is not started, and to start the bare hand tracking interactive mode.

The second preset condition determining unit 240 is configured to acquire the standard deviation of the accelerometer data within a second preset duration in real time, determine whether the standard deviation of the accelerometer data meets the second preset condition, and pause the bare hand tracking interactive mode and starting the gamepad tracking interactive mode in cases where the standard deviation of the accelerometer data meets the second preset condition.

Figure 3:
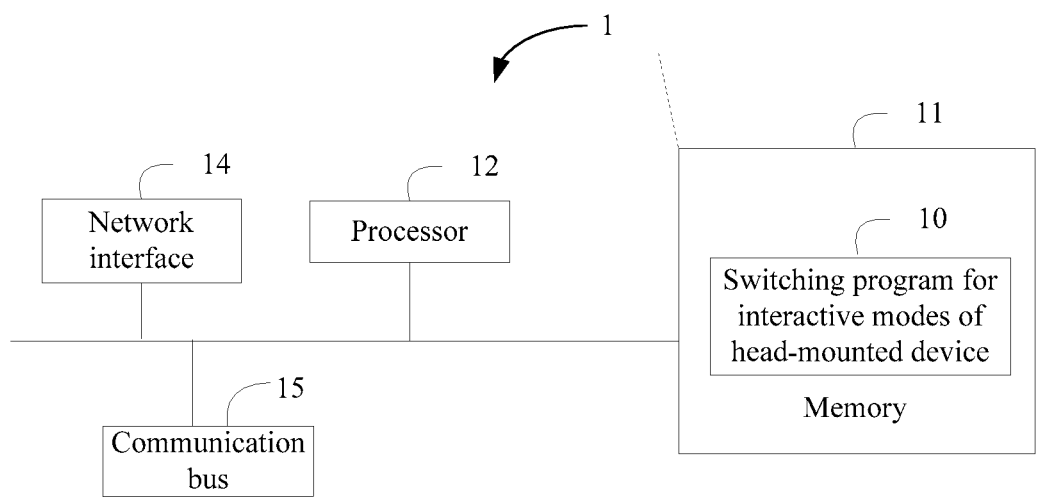
FIG. 3 is a logic diagram of an electronic apparatus according to some embodiments of the present disclosure.

Correspondingly, the embodiments of the present disclosure provide an electronic apparatus. FIG. 3 shows a schematic structure of an electronic apparatus according to some embodiments of the present disclosure.

As shown in FIG. 3, the electronic apparatus 1 may be a terminal device with an operating function, such as a VR/AR/MR head-mounted integrated device, a server, a smartphone, a tablet computer, a portable computer and a desktop computer. The electronic apparatus 1 includes a processor 12, a memory 11, a network interface 14 and a communication bus 15.

The memory 11 includes at least one type of readable storage medium, and the readable storage medium may be a non-volatile storage medium such as a flash memory, a hard disk, a multimedia card and a card-type memory 11. In some embodiments, the readable storage medium may be an internal storage unit of the electronic apparatus 1, such as a hard disk of the electronic apparatus 1. In some other embodiments, the readable storage medium may also be an external memory 11 of the electronic apparatus 1, such as a plug-in hard disk, a Smart Media Card (SMC), a Secure Digital (SD) card and a Flash Card which are configured on the electronic apparatus 1.

In the embodiment, the readable storage medium of the memory 11 is usually configured to store a switching program 10 for the interactive modes of the head-mounted device stored in the electronic apparatus 1. The memory 11 may further be configured to temporarily store data already outputted or to be outputted.

The processor 12 may be a Central Processing Unit (CPU) and a microprocessor or other data processing chips in some embodiments, and is configured to run program codes stored in the memory 11 or processing data, for example, executing the switching program 10 for the interactive modes of the head-mounted devices.

The network interface 14 optionally includes a standard wired interface and a wireless interface (such as a WI-FI interface) and is usually configured to establish communication connection between the electronic apparatus 1 and other electronic apparatuses.

The communication bus 15 is configured to implement a communication connection among these components.

FIG. 1 only shows the electronic apparatus 1 with the components 11-15. But it is to be appreciated that not all shown components need to be implemented, and more or fewer components may be alternatively implemented.

In some exemplary implementations, the electronic apparatus 1 may further include a UI. The UI may include an input unit such as a keyboard, a voice input device such as a device with a voice recognition function such as a microphone, and a voice output device such as a loudspeaker and a headset. In some exemplary implementations, the user interface can further include a standard wired interface and a wireless interface.

In some exemplary implementations, the electronic apparatus 1 further includes a display, and the display can be called as a display screen or a display unit. In some embodiments, the display can be an LED display, a liquid crystal display, a touch liquid crystal display, an Organic Light-Emitting Diode (OLED) touch device and the like. The display is used for displaying information processed in the electronic apparatus 1 and a visual user interface.

In some exemplary implementations, the electronic apparatus 1 further includes a touch sensor. An area provided by the touch sensor and used for touch operations by users is called as a touch area. Besides, the touch sensor can be a resistive touch sensor, a capacitive touch sensor and the like. Moreover, the touch sensor not only includes a contact touch sensor, and but also can include a proximity touch sensor and the like. Besides, the touch sensor can be a single senor, and can also be a plurality of arrayed sensors.

In the device embodiment shown in FIG. 1, the memory 11 serving as a readable storage medium can include an operating system and the switching program 10 for the interactive modes of the head-mounted device. The processor 12, when executing the switching program 10 for the interactive modes of the head-mounted device stored in the memory 11, implements operations of the switching method of interactive modes of a head-mounted device.

The embodiments of the present disclosure provide an exemplary implementation of the computer-readable storage media, which is as same as that of a switching method and system of interactive modes of a head-mounted device, and no more detailed description is provided here.

It is to be noted that terms "include" and "contain" or any other variants thereof are intended to cover nonexclusive inclusions herein, so that a process, apparatus, object or method including a series of elements not only includes those elements but also includes other elements which are not clearly listed or further includes elements intrinsic to the process, the apparatus, the object or the method. Under the condition of no more limitations, an element defined by the statement "including a/an . . . " does not exclude existence of the same other elements in a process, apparatus, object or method including the element.

The sequence numbers of the embodiments of the present disclosure are adopted not to represent superiority-inferiority of the embodiments but only for description. From the above descriptions about the implementation modes, those skilled in the art may clearly know that the method of the abovementioned embodiments may be implemented in a manner of combining software and a necessary universal hardware platform, and of course, may also be implemented through hardware, but the former is a preferred implementation mode under many circumstances. Based on such an understanding, the technical solutions of the embodiments of the present disclosure substantially or parts making contributions to the conventional art may be embodied in form of software product, and the computer software product is stored in a storage medium (for example, a ROM/RAM, a magnetic disk, and an optical disk), including a plurality of instructions configured to enable a computer (which may be a personal computer, a server, a network device, etc.) to execute the method in each embodiment of the present disclosure.

With reference to the drawings as above, the switching method and system of interactive modes of a head-mounted device and the electronic apparatus are described in an example mode. But, those skilled in the art should understand that for the switching method and system of interactive modes of a head-mounted device and the electronic apparatus, various improvements can further be made on the basis of not separating from contents of the present disclosure. Therefore, the protection scope of the present disclosure should be determined by contents of the attached claims.

What is claimed is:

1. A switching method of interactive modes of a head-mounted device, wherein the interactive modes of the head-mounted device comprise a gamepad tracking interactive mode and a hand tracking interactive mode which are able to be switched over each other; the switching method comprising:
   acquiring Six Degree of Freedom (6Dof) tracking data and Inertial Measurement Unit (IMU) data of a gamepad, the 6Dof tracking data comprising position data and attitude data of the gamepad;
   respectively acquiring a standard deviation of the position data, a standard deviation of the attitude data and a standard deviation of accelerometer data in the IMU data;
   determining whether the standard deviation of the position data, the standard deviation of the attitude data and the standard deviation of the accelerometer data within a first preset duration meet a first preset condition, wherein
   in cases where the standard deviation of the position data, the standard deviation of the attitude data and the standard deviation of the accelerometer data meet the first preset condition, starting the hand tracking interactive mode; moreover,
   acquiring the standard deviation of the accelerometer data within a second preset duration in real time, and determining whether the standard deviation of the accelerometer data meets a second preset condition, wherein
   in cases where the standard deviation of the accelerometer data meets the second preset condition, pausing the hand tracking interactive mode, and starting the gamepad tracking interactive mode, wherein
   determining whether the standard deviation of the accelerometer data meets the second preset condition comprises:
      determining whether standard deviations of a preset number of consecutive frames of the accelerometer data within the second preset duration are more than a third preset threshold; and
      in cases where the standard deviations of the preset number of consecutive frames of the accelerometer data within the second preset duration are more than the third preset threshold, determining that the second condition is met.

2. The switching method of interactive modes of a head-mounted device according to claim 1, wherein determining whether the standard deviation of the position data, the standard deviation of the attitude data and the standard deviation of the accelerometer data within a first preset duration meet a first preset condition comprises:
   determining whether both the standard deviation of the position data and the standard deviation of the attitude data are less than or equal to a first preset threshold, and continuing to determine whether the standard deviation of the accelerometer data is less than or equal to a second preset threshold in cases where both the standard deviation of the position data and the standard deviation of the attitude data are less than or equal to the first preset threshold; and
   in cases where both the standard deviation of the position data and the standard deviation of the attitude data are less than or equal to the first preset threshold and the standard deviation of the accelerometer data is less than or equal to the second preset threshold, determining that the first preset condition is met.

3. The switching method of interactive modes of a head-mounted device according to claim 2, wherein
   the first preset duration is in a range of 1 second-4 seconds, and the second preset duration is in a range of 1 second-4 seconds; and
   the first preset threshold is 0.6, and the second preset threshold is 0.2.

4. The switching method of interactive modes of a head-mounted device according to claim 3, wherein the first preset duration is 1.5 seconds.

5. The switching method of interactive modes of a head-mounted device according to claim 1, wherein
   the second preset duration is in a range of 1 second-4 seconds; and
   the third preset threshold is 0.03.

6. The switching method of interactive modes of a head-mounted device according to claim 5, wherein the second preset duration is 1.5 seconds.

7. The switching method of interactive modes of a head-mounted device according to claim 1, wherein
   the gamepad tracking interactive mode comprises: connecting a gamepad with the head-mounted device through signals to perform virtual reality interaction through the gamepad; and
   the hand tracking interactive mode comprises: acquiring and identifying gesture information and tracking information of a hand to perform virtual reality interaction through the gesture information and the tracking information.

8. The switching method of interactive modes of a head-mounted device according to claim 1, further comprising a default mode setting process, wherein
   the default mode setting process comprises: setting a default mode as the gamepad tracking interactive mode or the hand tracking interactive mode through a control system connected with the head-mounted device; and
   the control system is further used for controlling switching over the gamepad tracking interactive mode and the hand tracking interactive mode.

9. The switching method of interactive modes of a head-mounted device according to claim 8, wherein
   in cases where the standard deviation of the position data, the standard deviation of the attitude data and the standard deviation of the accelerometer data meet the first preset condition, the control system starts the hand tracking interactive mode and correspondingly stops the gamepad tracking interactive mode; and
   in cases where the standard deviation of the accelerometer data meets the second preset condition, the control system starts the gamepad tracking interactive mode and correspondingly stops the hand tracking interactive mode.

10. The switching method of interactive modes of a head-mounted device according to claim 1, further comprising:
   in cases where the standard deviation of the accelerometer data does not meet the second preset condition, continuing to execute the hand tracking interactive mode, and pausing the gamepad tracking interactive mode.

11. A switching system of interactive modes of a head-mounted device, the switching system comprising a memory storing instructions and a processor in communication with the memory, wherein the processor is configured to execute the instructions to:

acquire 6Dof tracking data and IMU data of a gamepad, the 6Dof tracking data comprising position data and attitude data of the gamepad;

respectively acquire a standard deviation of the position data, a standard deviation of the attitude data and a standard deviation of accelerometer data in the IMU data;

determine whether the standard deviation of the position data, the standard deviation of the attitude data and the standard deviation of the accelerometer data within a first preset duration meet the first preset condition; and in cases where the standard deviation of the position data, the standard deviation of the attitude data and the standard deviation of the accelerometer data meet the first preset condition, to determine that the gamepad tracking interactive mode is not started, and to start the hand tracking interactive mode;

acquire the standard deviation of the accelerometer data within a second preset duration in real time, determine whether the standard deviation of the accelerometer data meets a second preset condition, and pause the hand tracking interactive mode and start the gamepad tracking interactive mode in cases where the standard deviation of the accelerometer data meets the second preset condition, wherein the processor is configured to execute the instructions to determine whether the standard deviation of the accelerometer data meets the second preset condition in a following manner:

determining whether the standard deviations of a preset number of consecutive frames of the accelerometer data within the second preset duration are more than a third preset threshold; and determining that the second preset condition is met in cases where the standard deviations of the preset number of consecutive frames of the accelerometer data within the second preset duration are more than the third preset threshold.

12. The switching system of interactive modes of a head-mounted device according to claim 11, wherein the processor is configured to execute the instructions to determine whether the standard deviation of the position data, the standard deviation of the attitude data and the standard deviation of the accelerometer data meet the first preset condition in a following manner:

determining whether both the standard deviation of the position data and the standard deviation of the attitude data are less than or equal to a first preset threshold or not, and continuing to determine whether the standard deviation of the accelerometer data is less than or equal to a second preset threshold in cases where the standard deviation of the position data and the standard deviation of the attitude data are less than or equal to the first preset threshold; and determining that the first preset condition is met in cases where both the standard deviation of the position data and the standard deviation of the attitude data are less than or equal to the first preset threshold and the standard deviation of the accelerometer data is less than or equal to the second preset threshold.

13. The switching system of interactive modes of a head-mounted device according to claim 11, wherein the gamepad tracking interactive mode comprises: connecting the gamepad with the head-mounted device through signals to perform virtual reality interaction through the gamepad; and the hand tracking interactive mode comprises: acquiring and identifying the gesture information and the tracking information of the hand to perform virtual reality interaction through the gesture information and the tracking information.

14. A non-transitory computer-readable storage medium, having a computer program stored thereon, wherein the computer program, when executed by a processor, implements the method according to claim 1.

\* \* \* \* \*